United States Patent
Goyal

(10) Patent No.: US 10,938,658 B2
(45) Date of Patent: Mar. 2, 2021

(54) TRACKING LOGICAL NETWORK ENTITY STATE

(71) Applicant: Nicira, Inc., Palo Alto, CA (US)

(72) Inventor: Kapil Goyal, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 268 days.

(21) Appl. No.: 16/022,649

(22) Filed: Jun. 28, 2018

(65) Prior Publication Data

US 2020/0007392 A1 Jan. 2, 2020

(51) Int. Cl.
*H04L 12/24* (2006.01)

(52) U.S. Cl.
CPC ...... *H04L 41/0859* (2013.01); *H04L 41/0873* (2013.01)

(58) Field of Classification Search
USPC .......................................................... 709/220
See application file for complete search history.

(56) References Cited

U.S. PATENT DOCUMENTS

| | | | | |
|---|---|---|---|---|
| 2004/0059795 A1* | 3/2004 | Ramey | .................... | H04L 12/14 709/217 |
| 2009/0041012 A1* | 2/2009 | Taylor | ................. | H04L 41/0654 370/389 |
| 2014/0247753 A1* | 9/2014 | Koponen | ............ | H04L 43/0823 370/255 |
| 2017/0171055 A1* | 6/2017 | Wang | .................. | H04L 41/0853 |

* cited by examiner

*Primary Examiner* — Hermon Asres
(74) *Attorney, Agent, or Firm* — Adeli LLP

(57) ABSTRACT

Some embodiments provide a method for a central network manager that stores desired state information for multiple logical network entities for a logical network. The method stores (i) a desired state configuration for a logical network entity and (ii) a first state tracking object that identifies a version of the desired state configuration for at least the logical network entity. The method propagates to a set of managed forwarding elements (i) configuration data for the logical network entity and (ii) a second state tracking object for the logical network entity that identifies a version of the propagated configuration data. The first and second state tracking objects are compared to determine whether the propagated configuration data is based on the most recent desired state configuration.

27 Claims, 9 Drawing Sheets

TRACKING LOGICAL NETWORK ENTITY STATE

BACKGROUND

In a network control system, users create networking and security policies that are stored by a central manager. The network control system operates to enforce these policies on the data plane, by providing configuration data about the policies to forwarding elements that implement the policies. When a user creates a policy, the user is assured that this policy will be enforced asynchronously at some future time, but the user cannot verify when that policy actually has been enforced. As such, techniques are needed to allow users to determine whether policies that have been input to the network control system are being enforced at any given time.

BRIEF SUMMARY

Some embodiments provide a method of tracking version information for configuration data of logical network entities to verify that the configuration implemented on managed forwarding elements (MFEs) matches the desired state for the configuration. Some embodiments store state tracking objects at the central network manager for certain logical network entities the configuration of which is propagated to the MFEs, and propagate additional state tracking objects to the MFEs with the logical network entity configuration. To determine whether a particular MFE is implementing the most recent version of the logical network entity, some embodiments compare the state tracking object for the entity stored at the central network manager with the state tracking object for the entity stored at the particular MFE (or at a local controller for the MFE).

Specifically, for each logical network entity, the central network manager of some embodiments stores a desired state configuration based on the most recent configuration for the entity received from a user (e.g., a network administrator that accesses the central network manager through an API). For at least a subset of the logical network entities, the central network manager also stores a state tracking object that identifies the most recent version of the desired state configuration (e.g., using a version number). When the desired state configuration for an entity changes (e.g., because the user has modified the configuration for the entity), its version information in the state tracking object stored by the central network manager also changes.

After receiving a change to the desired state configuration for a logical network entity, the central manager propagates the new configuration for the entity to the MFEs. In addition, the state tracker object for the entity is propagated to the MFEs (or the local controllers for the MFEs), indicating that the entity as implemented on the MFE is based on the most recent desired state configuration for the entity.

In some embodiments, not all of the logical network entities are propagated as separate entities to the MFEs. Specifically, some embodiments include both propagated entities and contributing entities. The propagated entities are logical network entities for which separate configuration data is propagated to the MFEs with state tracking objects. The contributing entities, on the other hand, are logical network entities for which the central manager stores a desired state configuration that affects the propagated configuration data for one or more of the propagated entities. For instance, in some embodiments, logical switch ports are propagated as separate entities to the MFEs, while the logical switch to which the logical switch port belongs as well as logical port and logical switch setting profiles are contributing entities that affect the propagated configuration data for the logical switch port but are not propagated as separate entities. In some embodiments, firewall rules (and rule sets) and logical router ports are other examples of propagated logical network entities. In addition to logical switches, other examples of contributing entities include setting profiles (e.g., quality of service profiles, spoofguard profiles, IPFIX profiles, etc.) and other entities.

The state tracking object for a propagated entity includes version information for both the propagated entity and all of its contributing entities in some embodiments. Specifically, in some embodiments, each of the entities includes a version number that is incremented with each configuration change to its desired state, and the state tracking object for the propagated entity includes a version number that is a sum of the version numbers for the propagated entity and each of its contributing entities.

To propagate the desired state configuration for a propagated logical network entity to the MFEs, the network control system (e.g., the network manager) generates the configuration data based on the desired state configuration data for the propagated entity as well as all of the contributing entities that affect the configuration. The network control system also generates the propagated state tracking object based on the version numbers of the desired state configurations for each of the entities used to generate the configuration data. Thus, the propagated state tracking object reflects the version of the desired state configurations used to generate the propagated configuration data, and if a desired state configuration for one of the entities has been updated without those changes being propagated to the MFEs, then the state tracking object stored with the desired state will not match the state tracking object at the MFEs.

In some embodiments, in addition to single entities such as a logical port (the configuration data for which may incorporate configurations of other entities), propagated logical network entities may also include groups of entities. These groups of entities can include static groups (e.g., a predefined set of addresses) or dynamic groups (e.g., a set of logical ports having IP addresses in a specific subnet). Some embodiments generate (and propagate) state tracking objects for these grouping entities when a particular grouping entity is propagated to the MFEs. In addition, the grouping entities may include other grouping entities, so the state tracking objects of some embodiments also include an indicator that the grouping entity is both a tracked entity as well as a contributing entity (to any grouping entities of which it is a part).

When the central network manager propagates the configuration data to the MFEs, in some embodiments this data passes through one or more components between the source (central network manager) and destination (MFEs or local controller). In some embodiments, these components (e.g., a central network controller) may merge, split, and/or modify the configuration data for a logical network entity. For example, a component could merge the configuration data for a first entity with configuration data for a second entity to generate configuration data for a third entity (that is then propagated to the MFEs). In some embodiments, this component also modifies the state tracking objects for the first and second entities to indicate that these are both state tracking objects for the third (new) entity. Thus, the third entity will only be up-to-date if the version for both the first and second entities is correct.

Similarly, a component could divide the configuration data for a first logical network entity to generate configuration data for new second and third entities (that are then propagated to the MFEs). In some embodiments, this component also modifies the state tracking object for the first logical network entity to refer to (and thus be the state tracking object for) the second and third entities as well.

In some embodiments, an intermediate component could also modify the configuration data for a logical network entity (e.g., if an intermediate component adds entities to or removes entities from a grouping entity). In some such embodiments, the state tracking object for the logical network entity includes a separate version number for that intermediate component (in addition to the version number indicated by the source central network manager). When the intermediate component updates the configuration data for the entity, the component also updates this additional version number for the state tracking object before propagating both to the destination components. In this case, the intermediate component also stores a copy of the state tracking object.

Each of the propagated logical network entities has a span calculated by the network control system (e.g., by the network manager or by a central network controller) that identifies all of the MFEs to which the entity is propagated. For instance, the span of a logical port is not just the MFE connected to a data compute node (DCN) corresponding to the logical port (that therefore performs logical network processing for the DCN), but also any other MFEs connected to other DCNs corresponding to other logical ports of the same logical switch. In addition, if that logical switch connects to a logical router, then the span of the logical port additionally includes the MFEs connected to DCNs corresponding to other logical ports of other logical switches that connect to the logical router, as well as any gateways for the logical router (e.g., for connecting those DCNs to external networks).

When the network control system receives a query as to whether a particular logical network entity is currently implemented using the most up-to-date configuration, some embodiments determine the span of the entity (e.g., by querying the central network controller), then check each local controller for the MFEs within that span to determine whether the state tracking object for the entity matches the state tracking object for the entity stored with the desired state. Some embodiments also allow a user to query whether a particular logical network entity is properly implemented on a particular MFE, using similar logic. For logical network entities that are modified by the central network controller (e.g., dynamic grouping entities), some embodiments also retrieve the state tracking object from the central network controller and both (i) verify that the state tracking object stored by the central controller matches that stored by the network manager and (ii) verify that the additional version information modified by the central controller matches between the state tracking objects of the MFEs and the state tracking object from the central controller.

In some embodiments, the span is stored with the desired state configuration for at least some of the propagated logical network entities. To reduce the number of state tracking objects, some such embodiments generate a state tracking object per span rather than per propagated entity. Because all entities with the same span are propagated to all MFEs within the span, compliance can be adequately tracked in this manner. The version number for a particular span is the sum of all of the propagated entities that share that span (e.g., all of the logical ports with the same span), and one state tracking object is propagated to each of the MFEs in the span.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of tracking version information for configuration data of logical network entities to verify that the configuration implemented on managed forwarding elements (MFEs) matches the desired state for the configuration. Some embodiments store state tracking objects at the central network manager for certain logical network entities the configuration of which is propagated to the MFEs, and propagate additional state tracking objects to the MFEs with the logical network entity configuration. To determine whether a particular MFE is implementing the most recent version of the logical network entity, some embodiments compare the state tracking object for the entity stored at the central network manager with the state tracking object for the entity stored at the particular MFE (or at a local controller for the MFE).

Figure 1:
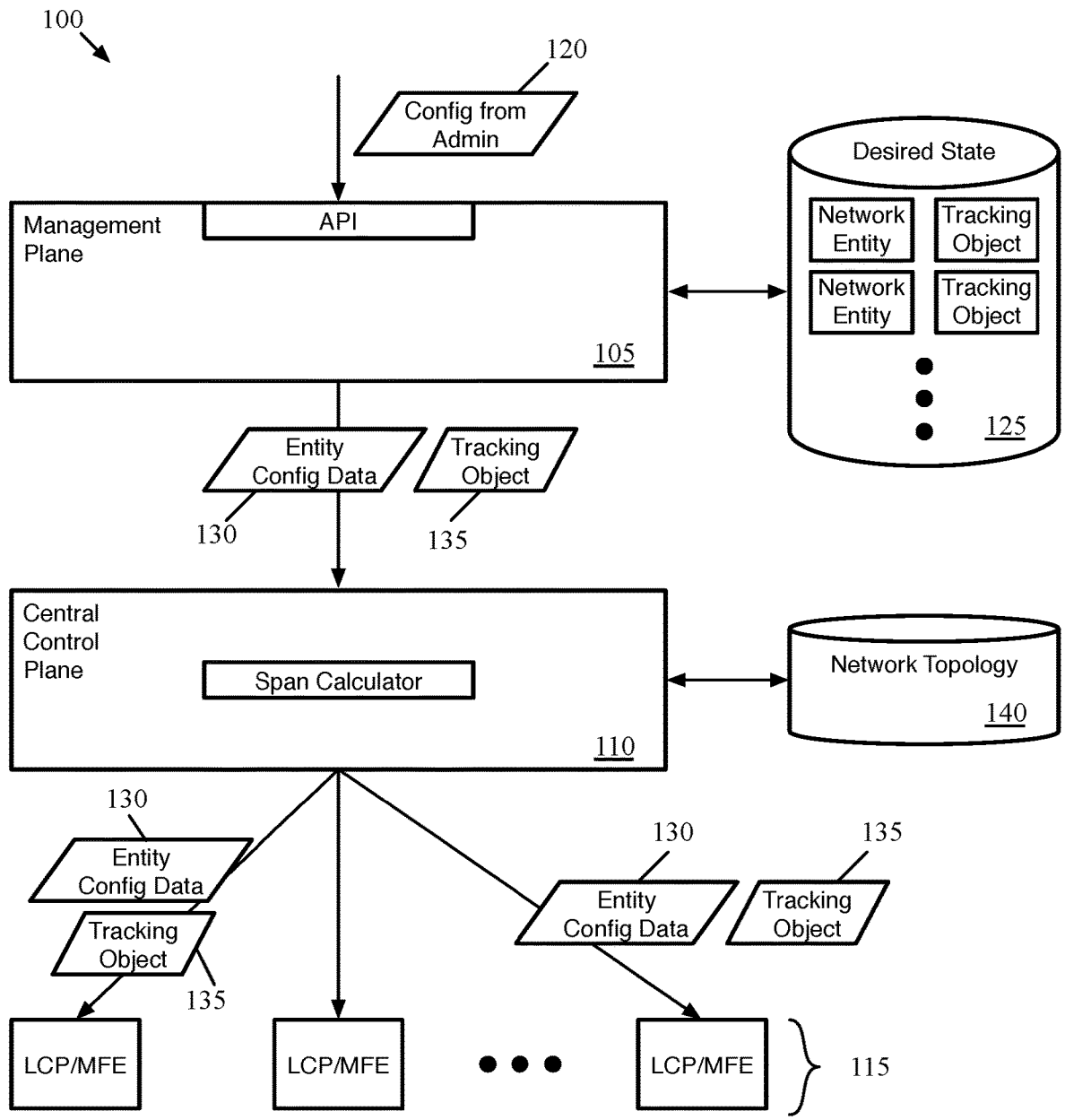
FIG. 1 conceptually illustrates a network control and management system of some embodiments that tracks version information for logical network entities that it manages.

FIG. 1 conceptually illustrates a network control and management system 100 of some embodiments that tracks version information for logical network entities that it manages. The network control and management system 100 includes a management plane 105, a central control plane 110, and a set of MFEs (with local control planes) 115. The network control and management system 100 operates to receive desired state configuration information for one or more logical networks and configure the MFEs 115 to implement these logical networks.

A logical network, in some embodiments, is a network abstraction (e.g., designed by an administrator of the network). The logical network includes logical switches and logical routers with logical switch ports and logical router ports, policies for these entities, as well as various other logical entities such as firewalls, load balancers, etc. The logical network is implemented in a distributed manner by various physical forwarding elements (e.g., hardware forwarding elements, software forwarding elements, etc.) according to the policies specified in the desired state.

The management plane 105 is formed by one or more central network managers in some embodiments. These network managers may be separate physical computers or applications operating on controller/manager computers. In some embodiments the network managers operate on the same computers as central controllers that form the central control plane 110.

The management plane 105 receives configuration information 120 for various logical network entities through an application programming interface (API) that enables administrators to set up and modify their logical networks. The management plane 105 stores this information, for each logical network entity, as a desired state configuration storage 125 (which may be a distributed storage, in some embodiments). For at least a subset of the logical network entities, the management plane 105 also stores in the storage 125 a state tracking object that identifies the most recent version of the desired state configuration for each network entity (e.g., using a version number). When the desired state configuration for an entity changes (e.g., because the administrator has modified the configuration for the entity), the management plane 105 updates the network entity desired state and also updates the version information in the state tracking object stored in the desired state storage 125.

After receiving an update to the desired state configuration for a logical network entity (e.g., creation of a new entity, changing an association of one entity with another, modifying an entity, etc.), the management plane 105 propagates the new configuration for the entity to the MFEs that implement the entity. As shown, in some embodiments, the management plane 105 performs any preparation needed for the entity configuration data (e.g., combining settings data defined by one entity with the data for another entity) and provides this data 130 to the central control plane 110. In addition, the management plane 105 propagates the state tracking object 135 for the entity with the entity configuration data.

As with the management plane 105, the central control plane 110 is formed by one or more central controllers in some embodiments. These central controllers may be separate physical computers or applications operation on controller/manager computers. In some embodiments, the central controllers operate on the same computers as the network managers that form the management 105.

The central control plane 110 receives the entity configuration data 130 (and associated state tracking object 135), determines the MFEs that require the configuration data for the particular entity, and provides the entity configuration data to those MFEs (or at least to the local controller for each MFE). The central control plane 110 stores the network topology 140, and a span calculator module 145 identifies the MFEs that require configuration data for a particular logical entity based on this network topology 140. The span calculation operations will be described in more detail below.

As shown, the central control plane 110 distributes the entity configuration data 130 and the associated state tracking object 135 to a subset of the MFEs 115, based on whether the MFEs are within the span of the logical entity. In some embodiments, each MFE (or at least a subset of the MFEs) also has an associated local controller that receives the entity configuration data 130 and configures the MFE to implement the logical network according to the configuration data. For example, in some embodiments at least a subset of the MFEs are software switches executing in the virtualization software (e.g., the hypervisor) of host computers, and the local controller also operates in the virtualization software. The local controllers convert the configuration data into data readable by the MFE (e.g., flow entries for a flow-based MFE, or other configuration data for other types of MFEs). Some embodiments also include a separate agent for communicating directly with the management plane, while in other embodiments this functionality is combined with the local controller.

In addition to using the configuration data 130 to configure their respective MFEs, in some embodiments the local controller also stores the state tracking object 135 for the MFE. This enables the management plane 105 to verify that the entity as implemented on a particular MFE is based on the most recent desired state configuration for the entity by requesting the state tracking object stored by the local controller, as described in greater detail below.

While FIG. 1 illustrates the case in which the network manager stores a state tracking object for each of the network entities for a desired state configuration is stored, in some embodiments not all of the logical network entities are propagated as separate entities to the MFEs. In this case, some embodiments only store (and propagate) state tracking objects for logical network entities that are propagated to the MFEs.

Figure 2:
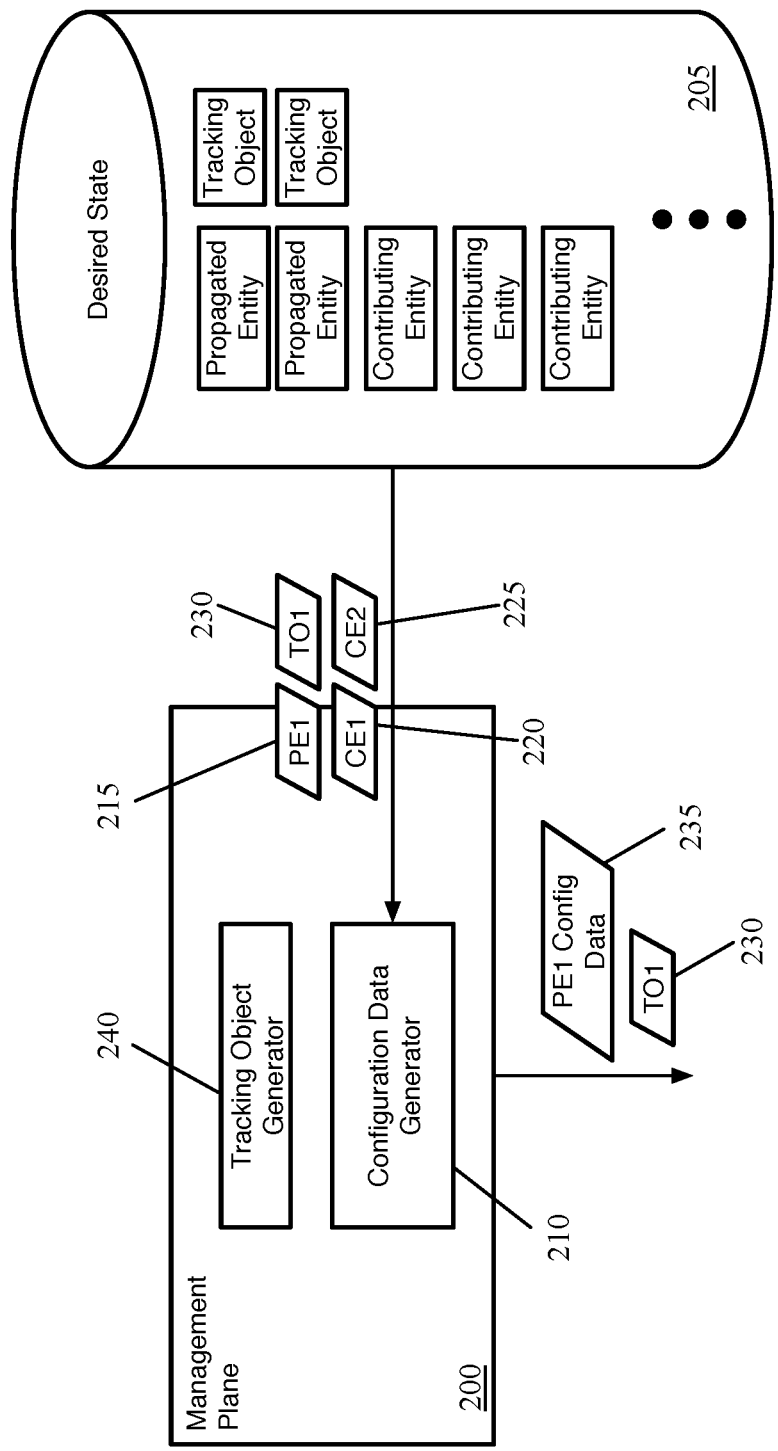
FIG. 2 conceptually illustrates the management plane and associated desired state storage for a network control system that includes both propagated and contributing entities.

FIG. 2 conceptually illustrates the management plane 200 and associated desired state storage 205 for a network control system that includes both propagated entities (also referred to as tracked entities) and contributing entities. The propagated entities are logical network entities for which separate configuration data is propagated to the MFEs with state tracking objects. The contributing entities, on the other hand, are logical network entities for which the central manager stores a desired state configuration that affects the propagated configuration data for one or more of the propagated entities. As shown, the desired state storage 205 includes desired state data for a set of propagated entities as well as a set of contributing entities, but only stores state tracking objects for the propagated entities.

In some embodiments, logical switch ports are propagated as separate entities to the MFEs, while the logical switch to which the logical switch port belongs is a contributing entity that affects the propagated configuration data for the logical switch port but is not propagated as a separate entity. Similarly, logical port setting profiles and logical switch setting profiles are not propagated as separate entities but are entities that affect the propagated logical switch port data and for which desired state is stored by the management plane. In some embodiments, firewall rules (and rule sets) and logical router ports are other examples of propagated logical network entities. In addition to logical switches, other examples of contributing entities include setting profiles (e.g., quality of service profiles, spoofguard profiles, IPFIX profiles, etc.) and other entities.

In FIG. 2, the management plane 200 includes a configuration data generator 210. The configuration data generator 210 is a module in the management plane that handles preparing configuration data to propagate through the network control system to the MFEs based on changes to the desired state data 205. For example, when the desired state configuration for a logical network entity is modified (e.g., added, deleted, or changed), the configuration data generator 210 of some embodiments prepares the new configuration for any propagated entities affected by the change and provides that updated configuration to the central control plane.

In this example, the configuration data generator 210 retrieves the desired state configurations 215-225 for a first propagated entity (PE1) as well as two contributing entities (CE1 and CE2) that affect the propagated configuration data for the propagated entity PE1. When retrieving the desired state configuration 215 for the propagated entity PE1, the configuration data generator 210 also receives the state tracking object (TO1) 230 for the propagated entity PE1. Using the desired state configurations 215-225 for these three entities PE1, CE1, and CE2, the configuration data generator 210 generates configuration data for the propagated entity PE1. For instance, if the contributing entities CE1 and CE2 are logical switch port profile settings that apply to the logical switch port PE1, then these settings are included in the configuration data for the logical switch port. The management plane 200 then propagates this configuration data 235 for PE1 to the central control plane, along with the state tracking object 230 for the propagated entity PE1.

The management plane, in some embodiments, also includes a tracking object generator 250. The tracking object generator 250 generates the state tracking objects for each of the propagated entities in the desired state storage 205, which are also propagated to the MFEs with the configuration data for the entities. In some embodiments, each of the logical network entities (both propagated entities and contributing entities) includes version information, which is incorporated into the state tracking object for the propagated entity by the tracking object generator 250.

Figure 3:
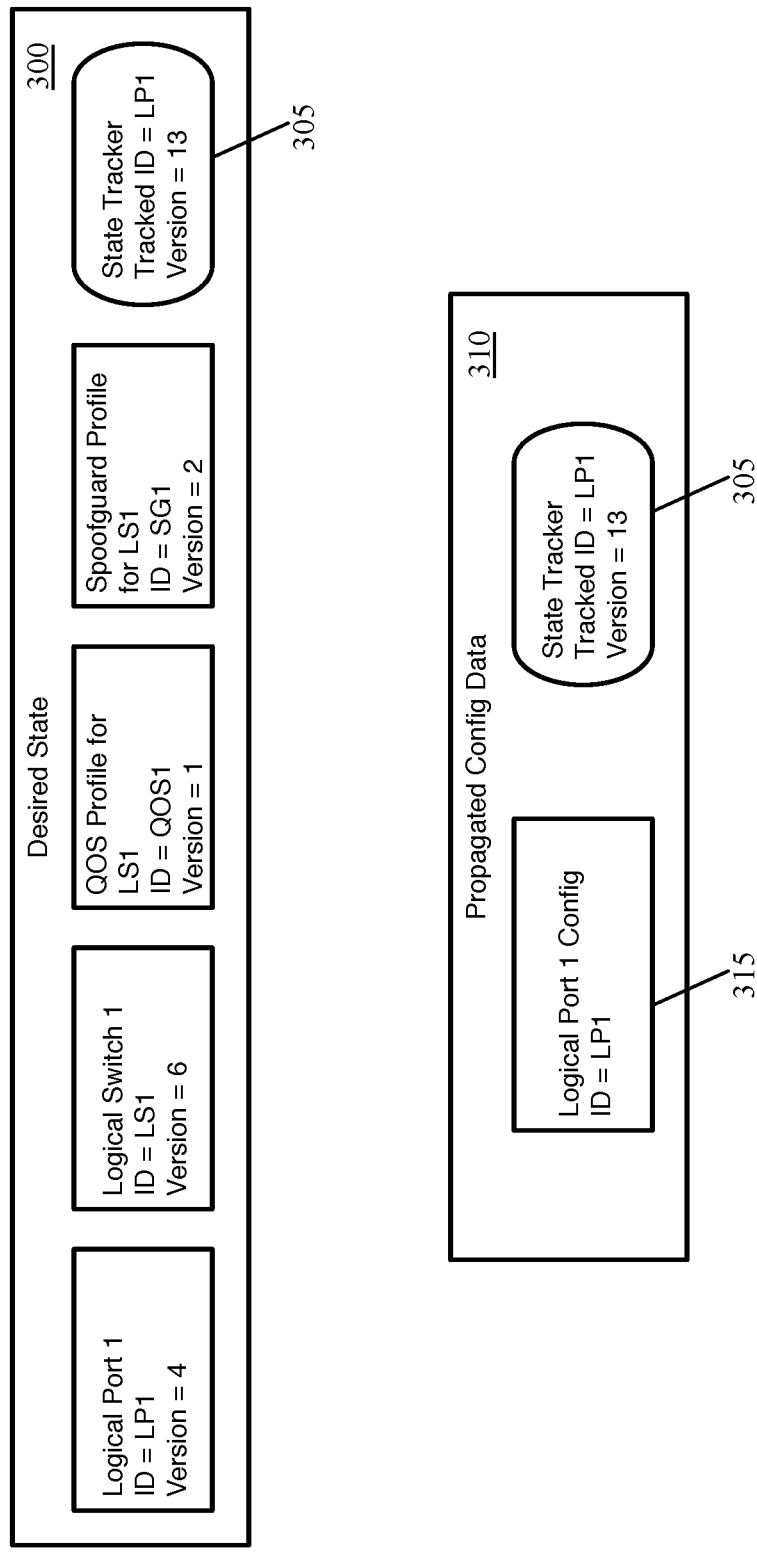
FIG. 3 conceptually illustrates an example of a state tracking object stored in desired state configuration data for a particular propagated entity, as well as the propagated configuration data and state tracking object for that entity.

FIG. 3 conceptually illustrates an example of a state tracking object stored in desired state configuration data for a particular propagated entity, as well as the propagated configuration data and state tracking object for that entity. As shown, the desired state configuration data 300 includes desired state data for a logical port LP1, the logical switch LS1 to which that logical port belongs, and two settings profiles (for quality of service and spoofguard settings) for the logical switch. The desired state data for each of these entities includes the actual configuration data defined by an administrator (the desired state for the entity) as well as an identifier for the entity and a version number. In some embodiments, this version number for an entity is incremented with each configuration change to the desired state for the entity.

The desired state data 300 also includes a state tracking object 305 for the logical port LP1, though not for any of the contributing entities. This state tracking object 305 identifies the logical port that it tracks (LP1) and includes a version number for the configuration. However, this version number is not simply that of the logical port desired state, but also reflects the version numbers for each of the contributing entities. Specifically, in this case, the version number stored in the state tracking object is a sum of the individual version numbers of the propagated entity as well as all of the contributing entities (in this case, 4+6+1+2=13). Some embodiments, rather than storing a single version number in the state tracking object, store the individual version numbers for the propagated entity and each contributing entity. However, for larger networks with numerous contributing entities, this can lead to very large state tracking objects that need to be distributed with each propagated entity.

The propagated data 310 includes the configuration data 315 generated for the logical port LP1 (the propagated entity) as well as the state tracking object 305. As described above, the management plane generates this configuration data 315 in some embodiments based on the propagated entity as well as all of its contributing entities. The state tracking object 305 propagated with the configuration data 315 reflects the version of the desired state configurations used to generate the propagated configuration data. As such, if a desired state configuration for one of the entities (either LP1 or one of its contributing entities) has been updated without those changes being propagated to the MFEs, then the state tracking object stored with the desired state will not match the state tracking object at the MFEs.

In the above example, the logical port is a single entity, the propagated configuration data for which incorporates configurations of other entities. In some embodiments, in addition to such single entities, propagated logical network entities can also include entity groupings (also referred to as containers). These groups of entities can include static groups (e.g., a predefined set of MAC or IP addresses used for firewall rules) or dynamic groups (e.g., a set of logical ports having IP addresses in a specific subnet).

Some embodiments generate (and propagate) state tracking objects for these grouping entities when a particular grouping entity is propagated to the MFEs. In addition, the grouping entities may include other grouping entities, so the state tracking objects of some embodiments also include an indicator that the grouping entity is both a tracked entity as well as a contributing entity (to any grouping entities of which it is a part). For example, if PE1 is a grouping entity that includes grouping entity PE2 (also a grouping entity) as well as two non-grouping entities SE1 and SE2, then the management plane would store state tracking objects for both PE1 and PE2. A change to the membership of PE2 would affect the version number in the state tracking object for PE2 (as a propagated entity) as well as the version number in the state tracking object for PE1 (because one of its contributing entities would have changed). Changes to the configurations of SE1 and SE2 would not affect the version number of either of the grouping entities PE1 or PE2, but removal of one of these entities from the group (or addition of another entity to the group) would affect the version number for PE1.

In some embodiments, the central control plane determines the actual membership of a dynamic group, even though the membership criterion for the group is determined at the management plane (e.g., by an administrator). In such embodiments, the management plane provides the entity (with its state tracking object) to the central control plane, and the central control plane calculates the members of the grouping entity (and provides this data to the local controllers or MFE). The central controller therefore is also required to compute the version information for the state tracking object of the grouping entity in some such embodiments, based on the version information for its various members. If the dynamic grouping entity is a member of another grouping entity, then this dynamically computed version information is used to update the version information for that additional entity as well (and so on for any additional layers of grouping entities).

As shown in FIG. 1, when the logical entity configuration data is propagated to the MFEs, the data passes through one or more components between its source (the management plane) and its destination (the MFEs or the local controller), such as the central control plane. In some embodiments, these intermediate components may perform operations on the configuration data that affect the ability to track the state of the propagated entities, such as merging, dividing, and/or modifying the configuration data for a particular entity.

Figure 4:
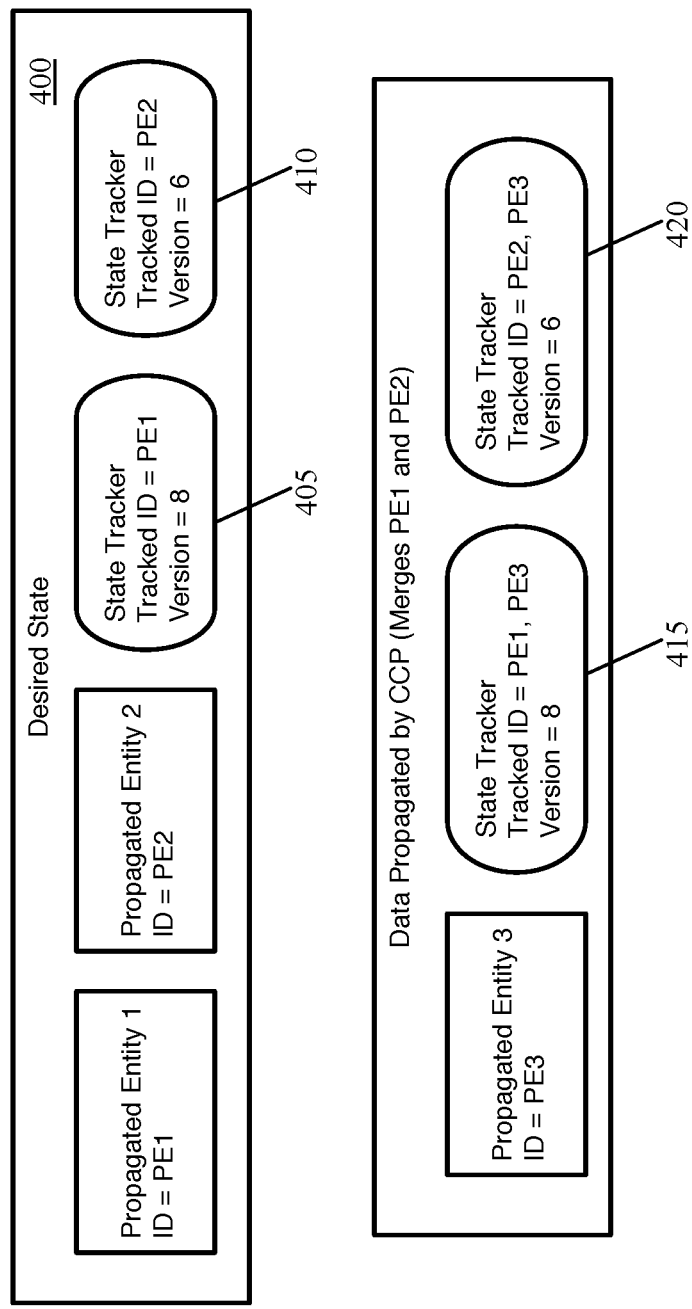
FIG. 4 conceptually illustrates two propagated entities that are merged by the central control plane of some embodiments to generate a third entity.

For example, a component could merge the configuration data for a first entity with configuration data for a second entity to generate configuration data for a third entity (that is then propagated to the MFEs). FIG. 4 conceptually illustrates two propagated entities that are merged by the central control plane of some embodiments to generate a third entity. As shown, the desired state configuration data 400 includes two propagated entities PE1 and PE2 with respective state tracking objects 405 and 410. The state tracking objects reflect the respective versions of each of these propagated entities (version 8 for PE1, version 6 for PE2).

The central controller receives the configuration data for these two entities (possibly including data from contributing entities incorporated by the management plane) and their respective state tracking objects 405 and 410, and merges the configuration data to generate configuration data for a third propagated entity PE3, which in turn is propagated downstream (e.g., to the local controllers or MFEs). As shown, the configuration data for this entity PE3 has two associated state tracking objects 415 and 420 in some embodiments. The first state tracking object 415 is associated with both PE1 and PE3 (and takes its version number from the state tracking object 405 for PE1), while the second state tracking object is associated with both PE2 and PE3 (and takes its version number from the state tracking object 410 for PE2). As such, a query for the state tracking object associated with either PE1 or PE2 would return the appropriate object to verify whether the most recent updates had been propagated to the MFEs, while a query for the state tracking object associated with PE3 would return both of these objects.

Figure 5:
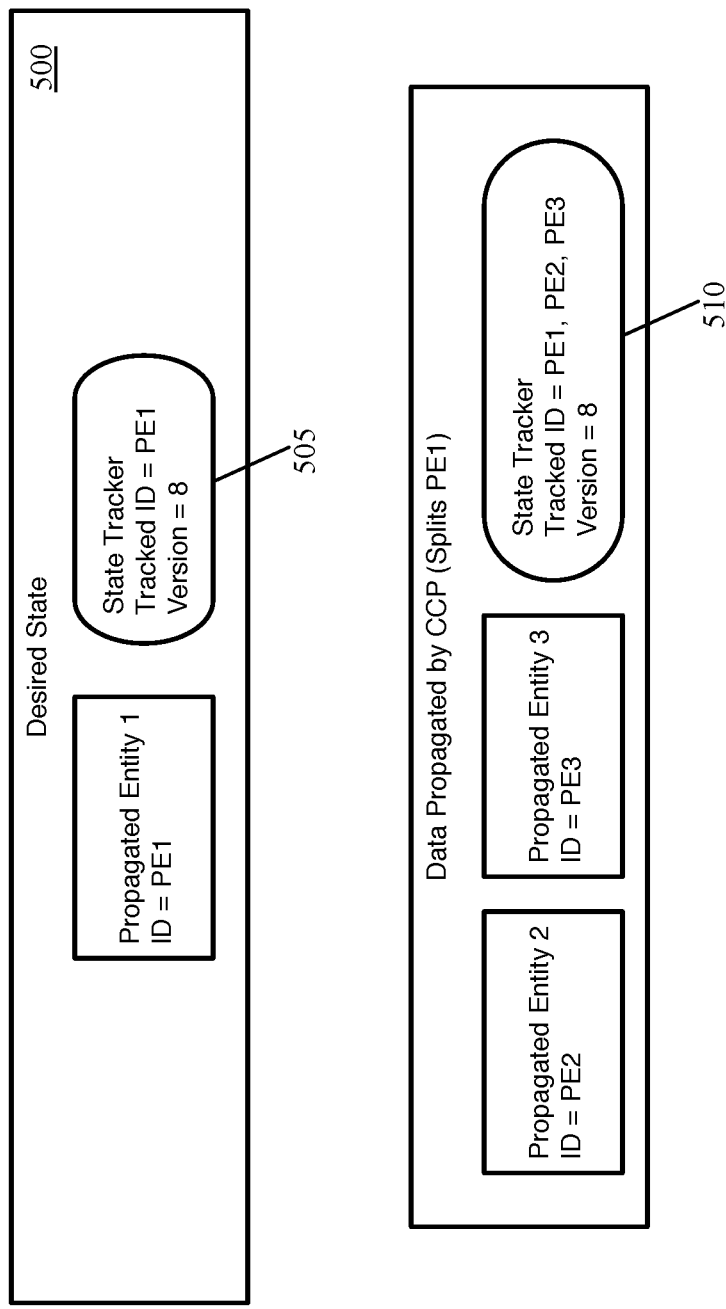
FIG. 5 conceptually illustrates a propagated entity that is divided by the central control plane of some embodiments to generate second and third entities.

Similarly, an intermediate component (e.g., the central controller) could divide the configuration data for a first logical network entity to generate configuration data for new second and third entities (that are then propagated to the MFEs). FIG. 5 conceptually illustrates a propagated entity that is divided by the central control plane of some embodiments to generate second and third entities. As shown, the desired state configuration data 500 includes a propagated entity PE1 with a respective state tracking object 505 that reflects the version of this propagated entity (version 8).

The central controller receives the configuration data for this entity PE1 (possibly including data from contributing entities incorporated by the management plane) and its state tracking object 505, and divides the configuration data to generate configuration data for two new propagated entities PE2 and PE3, which in turn are propagated downstream (e.g., to the local controllers or MFEs). As shown, the configuration data for these two new entities are both associated with the same single state tracking object 510 in some embodiments. This state tracking object 510 tracks the original entity PE1 as well as the two new entities PE2 and PE3, and takes its version number from the state tracking object 505 (version 8). As such, a query for the state tracking object associated with any of these three entities would return the object 510 to verify whether the most recent updates had been propagated to the MFEs.

In some embodiments, an intermediate component could also modify the configuration data for a logical network entity (e.g., if the central controller adds entities to or removes entities from a grouping entity). In some such embodiments, the state tracking object for the logical network entity includes a separate version number for that intermediate component (in addition to the version number indicated by the source central network manager). When the intermediate component updates the configuration data for the entity, the component also updates this additional version number for the state tracking object before propagating both to the destination components.

Figure 6:
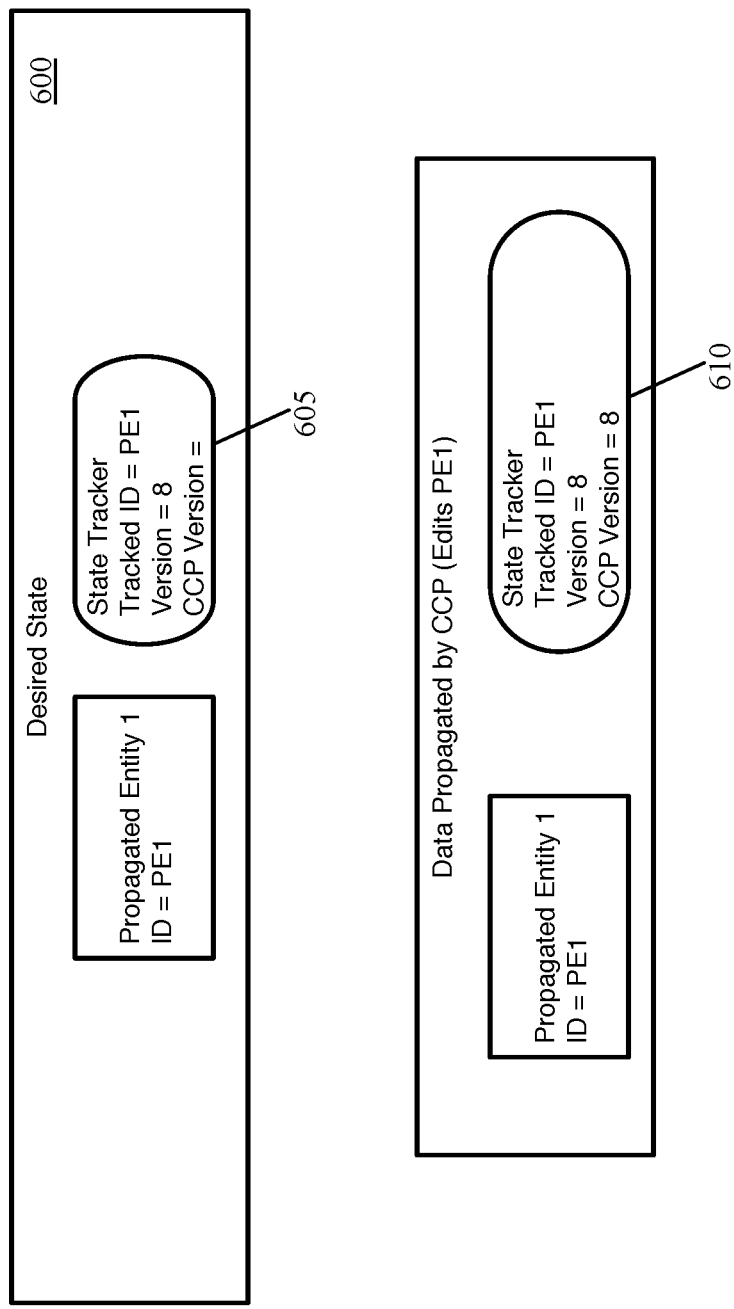
FIG. 6 conceptually illustrates a propagated entity that is modified by the central control plane.

FIG. 6 conceptually illustrates a propagated entity that is modified by the central control plane. As shown, the desired state configuration data 600 includes a propagated entity PE1 with a state tracking object 605. The state tracking object 605 reflects the version of this entity (version 8), and also includes a field for the central control plane version. In some embodiments, this field is not filled in for the state tracking object stored with the desired state 600 by the network manager.

The central controller receives the configuration data for this entity PE1 (possibly including data from contributing entities incorporated by the management plane) and its state tracking object 605, and modifies the configuration data (e.g., by dynamically updating the group membership if PE1 is a grouping entity). This updated entity PE1 is then propagated downstream (e.g., to the local controllers or MFEs). As shown, this configuration data is propagated with a modified state tracking object 610 that with the central control plane version field filled in. In some embodiments, the central controller also stores a copy of the modified state tracking object 610. While in this case the version number from the network manager and from the central control plane are the same, in some embodiments this is not required to be the case.

As mentioned above, the propagation of state tracking objects to the data plane MFEs (or at least to the local controllers) enables the network control system to verify whether the most recent desired state for a particular logical network entity has been propagated to (and implemented by) the MFEs. An administrator can query (e.g., through the management plane API) for a particular logical entity, and the management plane determines (via requests to the central controller and/or local controllers) whether the state tracking objects for the logical entity that are stored at the MFEs (or local controllers) match those stored with the desired state configuration.

Figure 7:
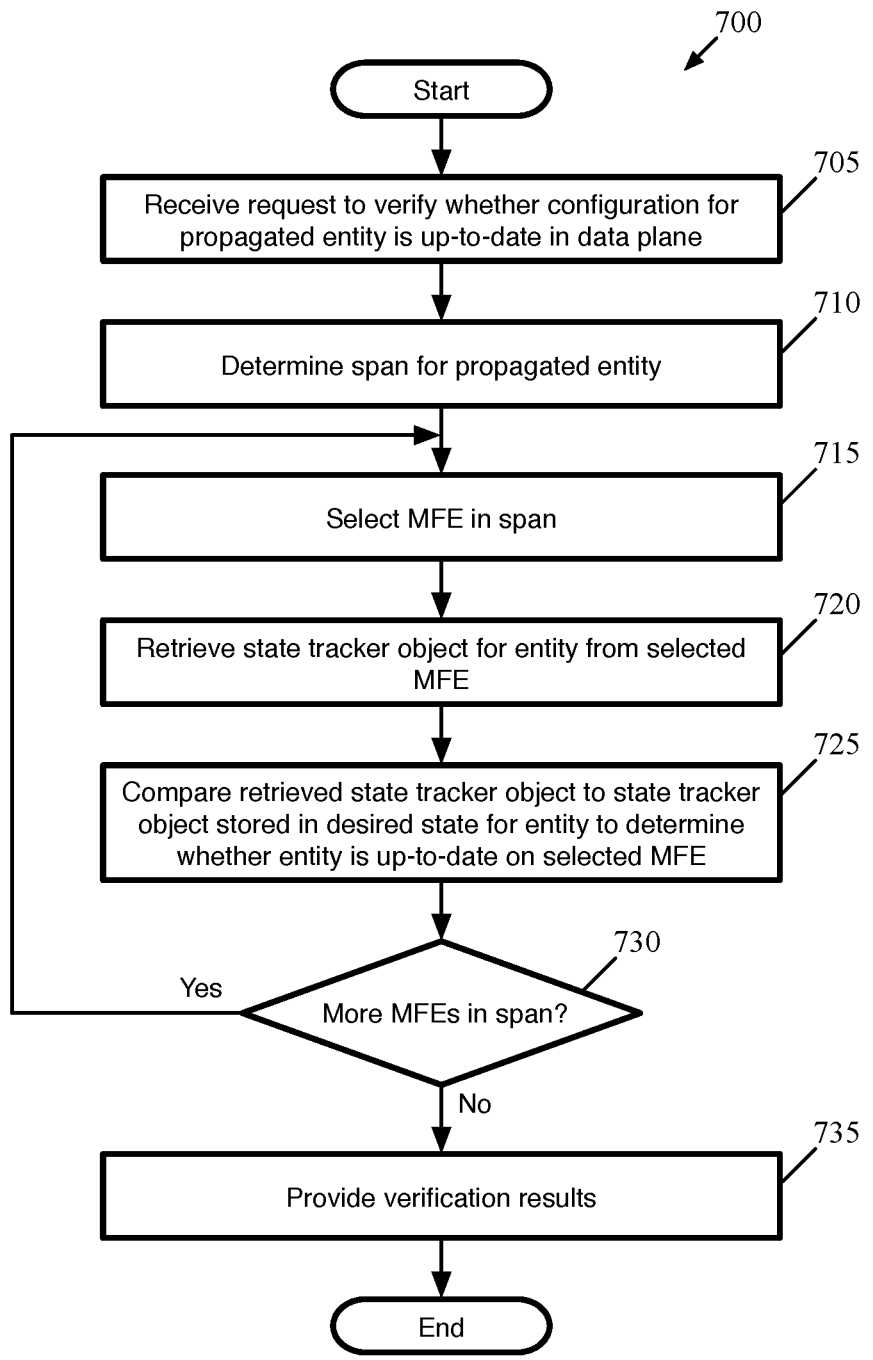
FIG. 7 conceptually illustrates a process of some embodiments for verifying whether the most recent desired state configuration for a logical entity is implemented on the MFEs of a network.

FIG. 7 conceptually illustrates a process 700 of some embodiments for verifying whether the most recent desired state configuration for a logical entity is implemented on the MFEs of a network. In some embodiments, the process 700 is performed by the management plane of a network control system (e.g., a network manager, which may be one of several network managers that forms the management plane).

As shown, the process 700 begins by receiving (at 705) a request to verify whether the most recent desired state configuration for a particular propagated logical network entity is implemented on the MFEs. This request may be received through the management plane API in some embodiments (e.g., from an administrator of the logical network to which the particular entity belongs). Some embodiments allow the administrator to specify a particular MFE (i.e., whether the desired state for the particular logical network entity is implemented on one specific MFE), while in other embodiments the management plane determines whether the entity is implemented correctly on all MFEs within its span. The process 700 is described in terms of this latter option.

In some embodiments, these queries are restricted to the entities that are propagated to the MFEs (and that have associated state tracking objects). In other embodiments, an administrator can provide a similar request for a contributing entity. In this case, the management plane determines all of the propagated entities for which that contributing entity affects the configuration and performs the subsequent verification operations for each of these propagated entities. In addition, some embodiments allow the administrator to query for compliance of a more general policy, which could have numerous propagated entities (e.g., for all logical ports of a logical switch, or for all propagated entities of an entire logical network).

Next, the process determines (at 710) the span for the propagated logical network entity. Each of the propagated logical network entities has a span calculated by the network control system (e.g., by the network manager or by a central network controller) that identifies all of the MFEs to which the entity is propagated. In some embodiments, the management plane queries the central control plane for this span. The central control plane either recalculates the span or looks up its previously calculated span (which the central control plane would have calculated when propagating the configuration data for the logical entity to the MFEs.

For instance, the span of a logical port is not just the MFE connected to a data compute node (DCN) corresponding to the logical port (that therefore performs logical network processing for the DCN), but also any other MFEs connected to other DCNs corresponding to other logical ports of the same logical switch. In addition, if that logical switch connects to a logical router, then the span of the logical port additionally includes the MFEs connected to DCNs corresponding to other logical ports of other logical switches that connect to the logical router, as well as any gateways for the logical router (e.g., for connecting those DCNs to external networks). For a logical firewall rule (or set of logical firewall rules), the span in some embodiments is the set of MFEs that could be required to apply the rule (or any of the rules for a set of rules).

Next, the process 700 verifies, for each MFE in the span of the entity, that the configuration for the entity is up to date on that MFE. Though shown as a linear process (i.e., repeated for each MFE, one after the other), it should be understood that the management plane of some embodiments performs these operations in parallel for numerous MFEs. For example, in some embodiments the management plane sends out requests to numerous MFEs at once (e.g., all of the MFEs), and processes the responses as they are received.

The process 700 selects (at 715) an MFE in the span. The process then retrieves (at 720) the state tracking object (or objects) for the entity from the selected MFE. In some embodiments, the management plane sends a request to each local controller within the span of the particular logical entity for all state tracking objects stored by the local controller that reference the entity. As shown in FIGS. 3-5, each state tracking object of some embodiments includes one or more identifiers for the propagated logical network entities that it tracks. Thus, if an administrator requests verification for an entity that is the result of merging multiple other entities, then a single local controller will return multiple state tracking objects. On the other hand, if the administrator requests verification for one of the entities for which desired state configuration data is stored, then only the state tracking object that references that entity will be returned by the local controller. In some embodiments, rather than requiring the management plane to perform all of these queries of the various different local controllers on demand, the management plane regularly performs these checks and caches the results for easy retrieval in case of an administrator query.

Next, the process 700 compares (at 725) the retrieved state tracking object to the state tracking object stored in the desired state for the entity in order to determine whether the entity configuration is up to date on the selected MFE. In some embodiments, the management plane compares the version number of the retrieved object to the version number of the object stored with the desired state configuration. If the version numbers are the same, then the most recent desired state configuration has been propagated to the local controller (and therefore has been implemented on the MFE). However, if the version numbers are different, then the entity is not completely up to date on the MFE.

However, in an example such as the logical port shown in FIG. 3, the comparison does not identify which of the entities that contributes to the propagated configuration data is up to date. For example, if a state tracking object with version 12 (rather than 13) was retrieved from an MFE, this would not identify whether the most recent desired state configuration for the logical port, logical switch, QOS profile, or spoofguard profile was yet to be propagated. Some embodiments generate new configuration data for the logical network entity using the most recent desired state configurations and propagate this configuration data to the MFE. Other embodiments perform additional checks to isolate which of the contributing entities (or the propagated entity) is not up to date (e.g., identifying other propagated entities that are affected by the contributing entities and retrieving the state tracking object for these entities). In some embodiments, the state tracking object stores separate version information for each contributing entity; however, this can result in very large state tracking objects that take up too much memory in larger networks.

In addition, for logical network entities that are modified by the central network controller (e.g., dynamic groups), the central controller stores its own state tracking object with ground truth version information. For these grouping entities, the version information from the management plane and the version information from the central controller are separate fields in some embodiments, both of which are verified by the management plane against the tracking objects retrieved from the local controllers. Some such embodiments also retrieve the state tracking object from the central network controller and both (i) verify that the state tracking object stored by the central controller matches that stored by the network manager and (ii) verify that the additional version information modified by the central controller matches between the state tracking objects of the MFE and the state tracking object from the central controller.

After the comparison, the process 700 determines (at 730) whether more MFEs are within the span for the entity. If additional MFEs need to be verified, the process returns to 715 to select another MFE in the span. Once all of the MFEs have been checked, the process provides (at 735) the verification results (e.g., through the management plane API). Some embodiments provide a list of any MFEs that are not up to date for the particular logical network entity, while other embodiments simply provide a binary answer for the system as a whole. In addition, as mentioned, some embodiments attempt to update the configuration data for any MFEs that are not yet up to date. The process 700 then ends.

In the above examples, one state tracking object (or approximately one, in certain cases) is propagated to each MFE for each propagated entity. To further reduce the number of required state tracking objects, some embodiments propagate one state tracking object per span rather than per entity. In such embodiments, the management plane stores the span of each propagated entity with its desired state configuration, and then a single state tracking object for all of the entities with that span. Because all entities with the same span are propagated to all MFEs within the span, compliance can be adequately tracked in this manner.

Figure 8:
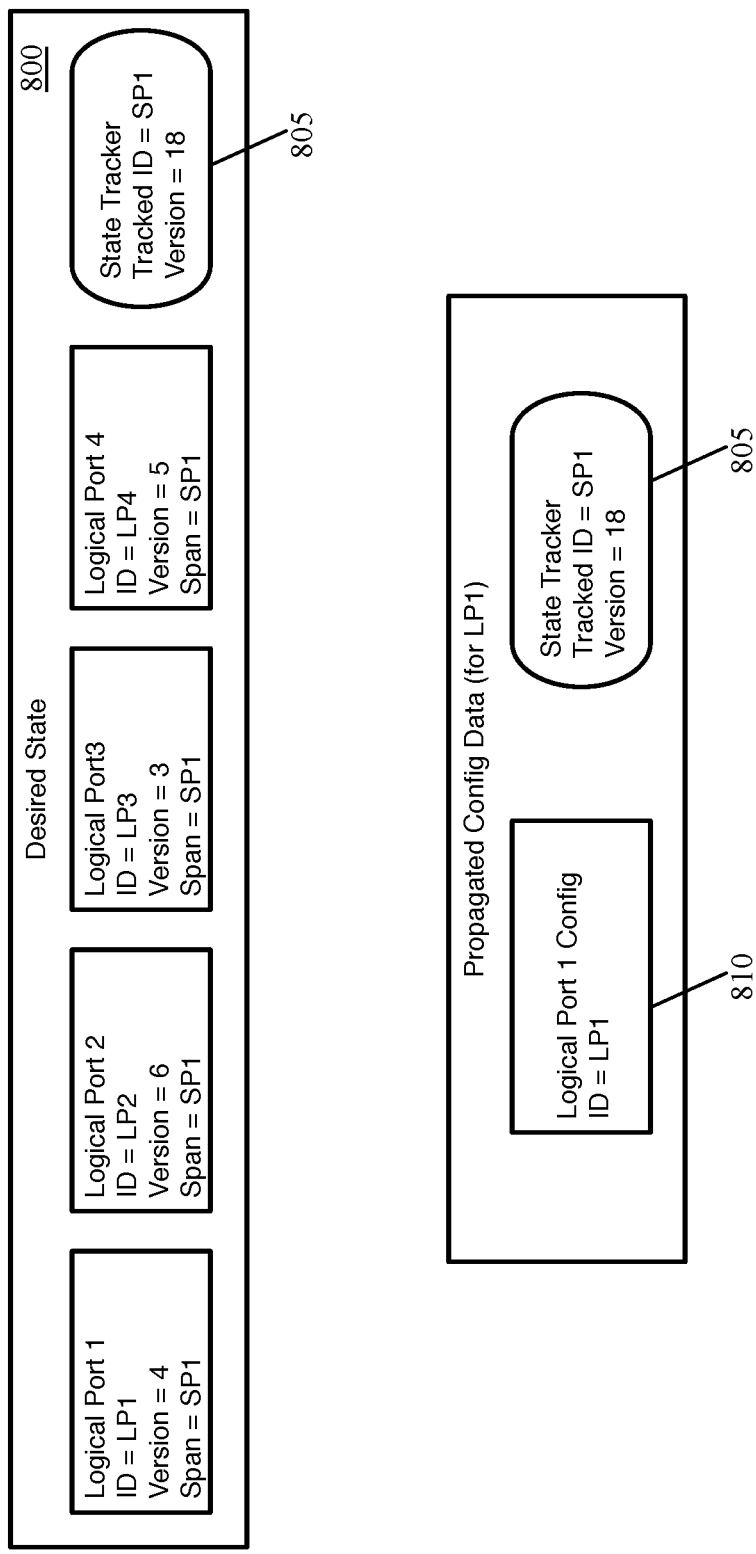
FIG. 8 conceptually illustrates four propagated entities that share a span as well as a single state tracking object for that span.

FIG. 8 conceptually illustrates four propagated entities that share a span as well as the single state tracking object for that span. As shown, the desired state configuration data 800 includes four logical ports LP1, LP2, LP3, and LP4. Each of these logical ports has the same span (SP1), and different version numbers. In this case, rather than four separate state tracking objects, the management plane stores a single state tracking object 805 for span SP1. The version number for this object is sum of the versions of all the propagated entities that share the span (with the version for each propagated entity possibly incorporating version information for each of its contributing entities), in this case 18.

The propagated configuration data for logical port LP1 includes configuration data 815 for that logical port and the state tracking object 805 for the span SP1. This state tracking object, however, is only propagated to each of the MFEs within the span once and does not need to be sent separately for each logical port.

While using coarser-grained references for the state tracking objects reduces the number of state tracking objects, it also decreases the ease of identifying which particular logical network entity has not yet been updated on a particular MFE. Some embodiments retrieve the configuration data itself from the local controller for a particular propagated entity to determine if that entity is up-to-date on a particular MFE.

In addition, other opportunities for optimization exist. For example, if entities are naturally organized into sets that are always propagated in their entirety to the MFEs, some embodiments track the sets rather than the individual entities. This enables further reduction of the number of state tracking objects propagated throughout the system.

In addition, while the above description relates specifically to logical network entities in a network control system, it should be understood that the state tracking and state implementation verification concepts can be expanded to other uses in which desired state data is propagated to downstream components, possibly through intermediate components.

Figure 9:
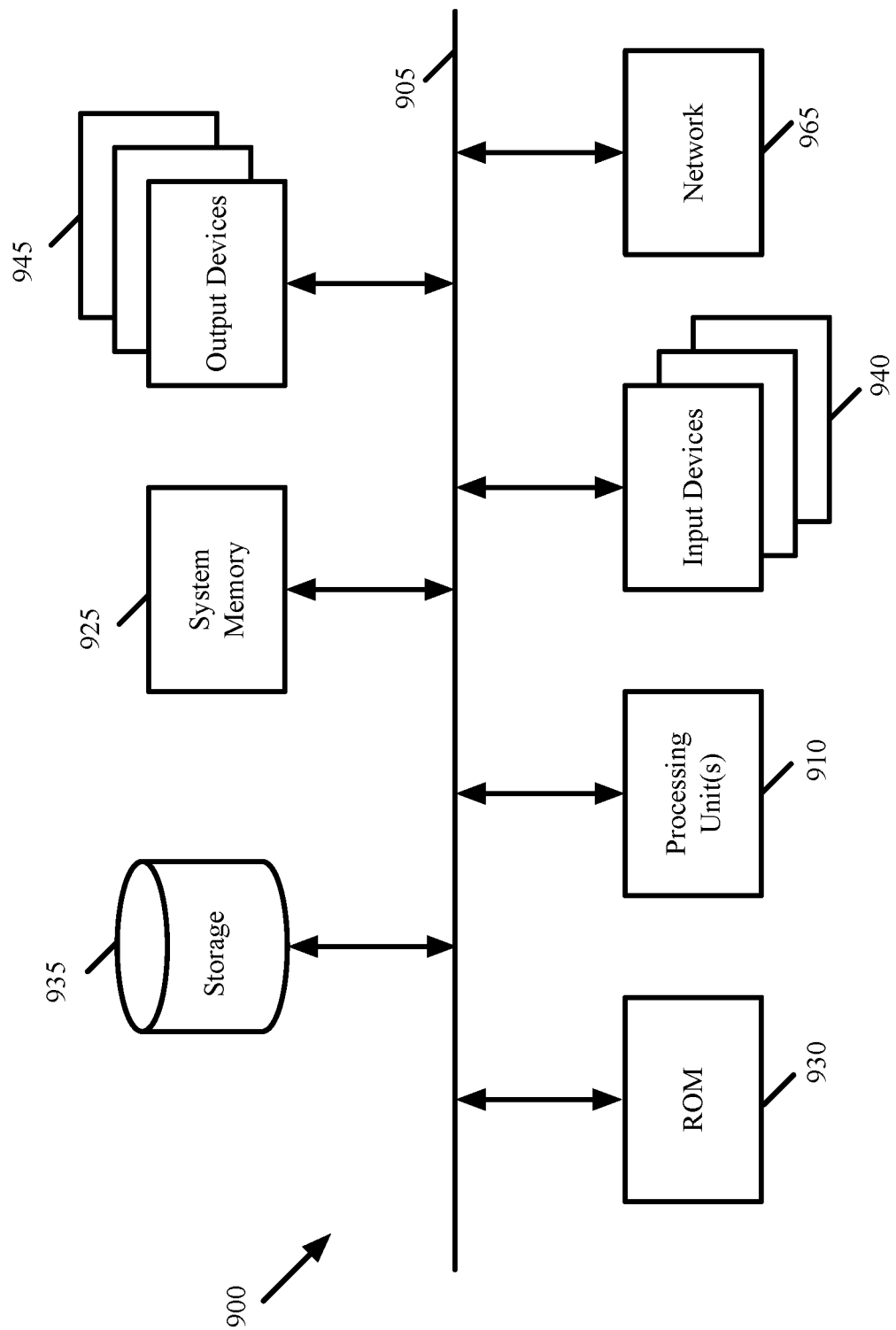
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. For a central network manager that stores desired state information for a plurality of logical network entities for a logical network, a method comprising:
    at the central network manager:
        storing (i) desired state configurations for a plurality of logical network entities and (ii) first state tracking objects for each of the logical network entities, the first state tracking object for each respective logical network entity of the logical network entities identifying a version of the desired state configuration for at least the respective logical network entity; and
        propagating to a set of managed forwarding elements (i) configuration data for first and second logical network entities and (ii) second state tracking objects for the first and second logical network entities that each identify a version of the propagated configuration data for the corresponding logical network entity,
    wherein the first and second state tracking objects for at least the first logical network entity are compared to determine whether the propagated configuration data for the first logical network entity is based on the most recent desired state configuration for the first logical network entity.

2. The method of claim 1 further comprising storing desired state configurations for at least one additional logical network entity used to generate the configuration data propagated to the set of managed forwarding elements for the first logical network entity.

3. The method of claim 2, wherein the first state tracking object identifies a version that incorporates (i) version information for the desired state configuration for the first logical network entity and (ii) version information for the desired state configuration for the at least one additional logical network entity.

4. The method of claim 3, wherein the second state tracking object for the first logical network entity identifies a version that incorporates version information of the desired state configurations for the first logical network entity and the at least one additional logical network entity used to generate the configuration data.

5. The method of claim 4, wherein the comparison of the first and second state tracking objects for the first logical network entity determines whether the version identified by the second state tracking object for the first logical network entity at a particular managed forwarding element matches the version identified by the first state tracking object for the first logical network entity.

6. The method of claim 5, wherein when the version identified by the second state tracking object for the first logical network entity at the particular managed forwarding element does not match the version identified by the first state tracking object for the first logical network entity, the configuration data propagated to the particular managed forwarding element is not based on the most recent desired state configuration for at least one of the first logical network entity and the at least one additional logical network entity.

7. The method of claim 3, wherein the version identified by the first state tracking object for the first logical network entity is a number that is a sum of version numbers for the desired state configurations for the first logical network entity and the at least one additional logical network entity.

8. The method of claim 2, wherein the first logical network entity is a logical port, wherein the at least one additional logical network entity comprises at least a logical switch to which the logical port belongs.

9. The method of claim 8, wherein the additional logical network entities further comprise configuration setting profiles for at least one of the logical port and the logical switch.

10. The method of claim 1, wherein propagating the configuration data for a particular logical network entity to the set of managed forwarding elements comprises providing the configuration data for the particular logical network entity to a central network controller that determines the set of managed forwarding elements to receive the configuration data for the particular logical network entity from a plurality of managed forwarding elements managed by the central network manager and central network controller.

11. The method of claim 10, wherein the central network controller provides the configuration data for the particular logical network entity to local controllers that operate on host computers along with the managed forwarding elements of the set of managed forwarding elements determined to receive the configuration data for the particular logical network entity.

12. The method of claim 11, wherein the local controllers (i) use the configuration data for the particular logical network entity to configure the respective managed forwarding elements and (ii) store the second state tracking objects for the particular logical network entity provided by the central network controllers.

13. The method of claim 1 further comprising generating the configuration data for the first logical network entity based on the desired state configuration for (i) the first logical network entity and (ii) at least one additional logical network entity.

14. The method of claim 1, wherein the configuration data for the first and second logical network entities and the second state tracking objects for the first and second logical network entities are propagated through at least one additional component between the network manager and a particular managed forwarding element.

15. The method of claim 14, wherein:
the additional component merges the configuration data for the first logical network entity with configuration data for a third logical network entity to generate configuration data for a fourth logical network entity that is propagated to the particular managed forwarding element;
the second state tracking object for the first logical network entity is updated by the additional component to relate to both the first and fourth logical network entities; and
the second state tracking object for the third logical network entity is also updated by the additional component to relate to both the second and fourth logical network entities.

16. The method of claim 14, wherein:
the additional component divides the configuration data for the first logical network entity to generate configuration data for third and fourth logical network entities that are propagated to the particular managed forwarding element;
the second state tracking object for the first logical network entity is updated by the additional component to relate to the first, third, and fourth logical network entities.

17. The method of claim 14, wherein:
the second state tracking object for the first logical network entity comprises a first set of version information;
the additional component modifies the configuration for the first logical network entity; and
the additional component updates the second state tracking object for the first logical network entity to include both the first set of version information and a second set of version information generated by the additional component.

18. A non-transitory machine readable medium storing a central network management application which when executed by at least one processing unit stores desired state information for a plurality of logical network entities for a logical network, the central network management application comprising sets of instructions for:
storing (i) desired state configurations for a plurality of logical network entities and (ii) first state tracking objects for each of the logical network entities, the first state tracking object for each respective logical network entity of the logical network entities identifying a version of the desired state configuration for at least the respective logical network entity; and
propagating to a set of managed forwarding elements (i) configuration data for first and second logical network entities and (ii) second state tracking objects for the first and second logical network entities that each identify a version of the propagated configuration data for the corresponding logical network entity,
wherein the first and second state tracking objects for a particular one of the logical network entities are compared to determine whether the propagated configuration data for the particular logical network entity is based on the most recent desired state configuration for the Particular logical network entity.

19. The non-transitory machine readable medium of claim 18, wherein the central network management application further comprises a set of instructions for storing desired state configurations for at least one additional logical network entity used to generate the configuration data propagated to the set of managed forwarding elements for the first logical network entity.

20. The method of claim 19, wherein the first state tracking object identifies a version that incorporates (i) version information for the desired state configuration for the first logical network entity and (ii) version information for the desired state configuration for at least one additional logical network entity.

21. The non-transitory machine readable medium of claim 20, wherein the second state tracking object for the first logical network entity identifies a version that incorporates version information of the desired state configurations for the first logical network entity and the at least one additional logical network entity used to generate the configuration data, wherein the comparison of the first and second state tracking objects for the first logical network entity determines whether the version identified by the second state tracking object for the first logical network entity at a particular managed forwarding element matches the version identified by the first state tracking object for the first logical network entity.

22. The non-transitory machine readable medium of claim 20, wherein the version identified by the first state tracking object for the first logical network entity is a number that is a sum of version numbers for the desired state configurations for the first logical network entity and the at least one additional logical network entity.

23. The non-transitory machine readable medium of claim 18, wherein the set of instructions for propagating the configuration data for a particular logical network entity to the set of managed forwarding elements comprises a set of instructions for providing the configuration data for the particular logical network entity to a central network controller that determines the set of managed forwarding elements to receive the configuration data for the particular logical network entity from a plurality of managed forwarding elements managed by the central network management application and central network controller, wherein the central network controller provides the configuration data for the particular logical network entity to local controllers that operate on host computers along with the managed forwarding elements of the set of managed forwarding elements determined to receive the configuration data for the particular logical network entity.

24. The non-transitory machine readable medium of claim 18, wherein the configuration data for the first and second logical network entities and the second state tracking objects for the first and second logical network entities are propagated through at least one additional component between the network manager and a particular managed forwarding element.

25. The non-transitory machine readable medium of claim 24, wherein:
the additional component merges the configuration data for the first logical network entity with configuration data for a third logical network entity to generate configuration data for a fourth logical network entity that is propagated to the particular managed forwarding element;
the second state tracking object for the first logical network entity is updated by the additional component to relate to both the first and fourth logical network entities; and
the second state tracking object for the third logical network entity is also updated by the additional component to relate to both the second and fourth logical network entities.

26. The non-transitory machine readable medium of claim 23, wherein:
the additional component divides the configuration data for the first logical network entity to generate configuration data for third and fourth logical network entities that are propagated to the particular managed forwarding element; and
the second state tracking object for the first logical network entity is updated by the additional component to relate to the first, third, and fourth logical network entities.

27. The non-transitory machine readable medium of claim 23, wherein:
the second state tracking object for the first logical network entity comprises a first set of version information;
the additional component modifies the configuration for the first logical network entity; and
the additional component updates the second state tracking object for the first logical network entity to include both the first set of version information and a second set of version information generated by the additional component.

* * * * *